United States Patent [19]

Katz et al.

[11] Patent Number: 4,963,422
[45] Date of Patent: Oct. 16, 1990

[54] ETHYLENE VINYL ACETATE ALKYL ACRYLATE COMPOSITIONS FOR FLOCKING ADHESIVES

[75] Inventors: Howard Katz, Hightstown, N.J.; David J. Lunsford, Mauldin, S.C.

[73] Assignee: National Starch and Chemical Investment Holding Corporation, Wilmington, Del.

[21] Appl. No.: 419,924

[22] Filed: Oct. 11, 1989

Related U.S. Application Data

[60] Division of Ser. No. 119,248, Oct. 28, 1987, abandoned, which is a continuation of Ser. No. 904,063, Sep. 4, 1986, abandoned.

[51] Int. Cl.$^5$ .............................................. B05D 1/14
[52] U.S. Cl. .................................. 428/90; 427/206; 526/304
[58] Field of Search .................. 427/26, 206; 428/90; 526/304

[56] References Cited

U.S. PATENT DOCUMENTS

| | | | |
|---|---|---|---|
| 3,345,318 | 10/1967 | Lindemann et al. | 260/29.6 |
| 3,483,171 | 2/1969 | Kuhlkamp et al. | 260/80.6 |
| 3,708,444 | 1/1973 | Ganzler et al. | 260/2.5 |
| 3,714,096 | 1/1973 | Giovanni | 260/29.4 UA |
| 3,734,870 | 5/1973 | Schroeder et al. | 260/2.5 |
| 3,755,237 | 8/1973 | Isaacs et al. | 260/29.6 TA |
| 3,900,663 | 8/1975 | Barabas et al. | 428/254 |
| 3,933,691 | 1/1976 | Lindemann | 260/2.5 L |
| 3,950,302 | 4/1976 | Rauterkus et al. | 260/42.52 |
| 4,001,158 | 1/1977 | Lindemann | 260/29.6 |
| 4,073,779 | 2/1978 | Wiest et al. | 260/79.3 MU |
| 4,187,353 | 2/1980 | Schroeder | 521/149 |
| 4,239,563 | 12/1980 | Iacoviello | 156/72 |
| 4,322,516 | 3/1982 | Wiest et al. | 526/307.7 |
| 4,446,274 | 5/1984 | Okazaki et al. | 524/812 |
| 4,510,274 | 4/1985 | Okazaki et al. | 523/411 |
| 4,542,182 | 9/1985 | Schuppiser et al. | 524/563 |
| 4,610,920 | 9/1986 | Mudge et al. | 428/288 |
| 4,692,366 | 9/1987 | Mudge | 428/90 |
| 4,696,951 | 9/1987 | Lunsford et al. | 521/65 |
| 4,734,307 | 3/1988 | Thorsrud | 427/206 |

FOREIGN PATENT DOCUMENTS 1188635 4/1970 United Kingdom .

OTHER PUBLICATIONS

"Producing Durable Flocked Goods", Vincent J. Moser and Arthur L. Allewelt; Resin Review, vol. XX, No. 3, pp. 3–8.

"Acrylic Adhesives for the Testile Flocking Industry", George C. Kantner and Frank X. Chancler; Resin Review, vol. XXXII, No. 2, pp. 17–27.

"Principles of Flocking", Ulrich Maag, Adhesives Age, Sep. 1975.

*Primary Examiner*—Shrive Beck
*Attorney, Agent, or Firm*—Ellen T. Dec; Edwin M. Szala

[57] ABSTRACT

Flocking adhesives are prepared from an aqueous emulsion prepared by the emulsion polymerization of a vinyl ester of an alkanoic acid interpolymerized with:

(a) 10 to 30% by weight of ethylene;
(b) 30 to 50% by weight of a $C_4$–$C_8$ alkyl acrylate;
(c) 1 to 5% by weight of an N-methylol containing copolymerizable monomer;
(d) 0 to 4% by weight of an olefinically unsaturated carboxylic acid; and
(e) 0 to 1% by weight of a polyethylenically unsaturated comonomer.

9 Claims, No Drawings

ETHYLENE VINYL ACETATE ALKYL ACRYLATE COMPOSITIONS FOR FLOCKING ADHESIVES

This application is a division of application Ser. No. 119,248, filed Oct. 28, 1987, now abandoned which was a continuation of application Ser. No. 904,063 filed Sept. 4, 1986, now abandoned.

The present invention is directed to the use in flocking adhesives of emulsion polymers comprising a vinyl ester of an alkanoic acid, ethylene, a $C_4$–$C_8$ alkyl acrylate and an N-methylol containing monomer.

Flocking is a process by which textile fibers are embedded into an adhesive on a substrate producing an article which normally has a velvet or suede-like hand or feel. The flocking process is carried out by passing a substrate, which has been coated or printed with a composition comprising the adhesive polymer, through an electrical field in which short fibers are electrostatically directed and oriented into the adhesive. In another technique, a beater bar orients and embeds the fibers by means of vibration. Still other techniques combine both the electrostatic field and a beater bar presumably yielding optimum flock orientation and density.

It is important in such applications that the resultant flocked products have a soft hand and drape as well as good durability properties: properties primarily controlled by the choice of the flocking adhesive. It is also important, in some applications, that the adhesive system have resistance to washing and dry cleaning, atmospheric oxidation and ultraviolet and heat degradation appropriate to the intended end use.

Heretofore, N-methylol containing comonomers have been polymerized into acrylate based lattices for flocking where a soft hand or feel is the most important criteria, however these acrylate based flocking adhesives are relatively high in cost. N-methylolacrylamide-ethylene/vinyl acetate-based flocking adhesives are more economical and yield the necessary strength properties but are deficient in softness for some applications requiring extreme softness.

It is therefore an object of the present invention to provide a flocking adhesive based on ethylene vinyl ester copolymer emulsions which is characterized by an optimum balance of softness and strength.

SUMMARY OF THE INVENTION

We have now found that flocking adhesives may be prepared utilizing an aqueous emulsion prepared by the emulsion polymerization of a vinyl ester of an alkanol acid interpolymerized with:
(a) 10 to 30% by weight of ethylene;
(b) 30 to 50% by weight of a $C_4$–$C_8$ alkyl acrylate;
(c) 1 to 5% by weight of an N-methylol containing copolymerizable monomer;
(d) 0 to 4% by weight of an olefinically-unsaturated carboxylic acid containing 3 to 6 carbon atoms; and
(e) 0 to 1% by weight of a polyethylenically unsaturated comonomer.

In accordance with a preferred embodiment, the polymerization is performed using batch or semi-batch emulsion polymerization techniques to produce flocking adhesives characterized by superior resistance to wet and dry cleaning.

As used herein, the term "batch" refers to a process whereby all the major monomers are charged to the reactor initially and the N-methylol containing monomer is added uniformly and concurrently with the initiators. The term "semi-batch" refers to a process whereby the vinyl ester and ethylene are charged initially and the N-methylol containing monomer and acrylate components are pre-emulsified and added uniformly and concurrently with the initiators. In the slow-addition process water, the emulsifying agents and optionally a minor portion of the monomers are initially charged in the reactor and the monomers then added gradually with the initiators over the course of the reaction.

The resultant emulsions are combined with suitable thickeners and pigments and optional foaming agents. Fabrics prepared with these flocking adhesives possess superior durability properties as well as the desirable softness characteristic of those containing high acrylate content yet at a substantially reduced cost.

DESCRIPTION OF THE PREFERRED EMBODIMENTS

The vinyl esters utilized herein are the esters of alkanoic acids having from one to about 13 carbon atoms. Typical examples include: vinyl formate, vinyl acetate, vinyl propionate, vinyl butyrate, vinyl isobutyrate, vinyl valerate, vinyl 2-ethyl-hexanoate, vinyl isooctanoate, vinyl nonoate, vinyl decanoate, vinyl pivalate, vinyl versatate, etc. Of the foregoing, vinyl acetate is the preferred monomer because of its ready availability and low cost.

The N-methylol component is generally N-methylol acrylamide although other mono-olefinically unsaturated compounds containing an N-methylol group and capable of copolymerizing with ethylene and the vinyl ester may also be employed. Such other compounds include, for example, N-methylol methacrylamide or lower alkanol ethers thereof, or mixtures thereof. Adequate durability may be obtained using levels of the N-methylol comonomer as low as about 1 or 1.5% by weight so long as the wet properties of the flocked surface are not critical. In cases where exposure to water or moisture may be substantial, higher levels in the range of about 2.5% or more are required.

The alkyl acrylates used herein are those containing 4 to 8 carbon atoms in the alkyl group and include butyl, hexyl, 2-ethyl hexyl and octyl acrylate. The corresponding methacrylates may also be used herein as may mixtures of any of the above.

The olefinically-unsaturated carboxylic acids which may optionally be present are the alkenoic acids having from 3 to 6 carbon atoms or the alkenedioic acids having from 4 to 6 carbon atoms, like acrylic acid, methacrylic acid, crotonic acid, itaconic acid, maleic acid or fumaric acid, or mixtures thereof in amounts sufficient to provide up to about 4% by weight, of carrier units in the final copolymer.

Optionally, polyunsaturated copolymerizable monomers may also be present in small amounts, i.e., up to about 1% by weight. Such comonomers would include those polyolefinically-unsaturated monomers copolymerizable with vinyl acetate and ethylene, such as lower alkenyl lower alkenoates, for example, vinyl crotonate, allyl acrylate, allyl methacrylate; di-lower alkenyl alkanedioates, for example, diallyl maleate, divinyl adipate, diallyl adipate; dilower alkenyl benzenedicarboxylates, for example, diallyl phthalate; lower alkanediol di-lower alkenoates, for example, ethylene glycol diacrylate, ethylene glycol dimethacrylate, butanediol dimethacrylate; lower alkylene bis-acrylamides and lower alkylene bismethacrylamides, for example, methylene bis-acrylamide; triallyl cyanurate, tec. In addition, certain copolymerizable monomers which assist in the stability of the copolymer emulsion, e.g., acrylamide and vinyl sulfonic acid, are also useful herein as latex stabilizers. These optionally present monomers, if employed, are added in very low amounts of from 0.1 to about 2% by weight of the monomer mixture.

In accordance with either the preferred batch or semi-batch procedures utilized herein the vinyl acetate, ethylene, acrylate, any optional monomers and the N-methylol containing monomer are polymerized in an aqueous medium under pressures not exceeding 100 atmospheres in the presence of a catalyst and at least one emulsifying agent, the aqueous system being maintained by a suitable buffering agent at a pH of 2 to 6, the catalyst being added incrementally or continuously. If a batch process is used, the vinyl acetate and the acrylate components are suspended in water and are thoroughly agitated in the presence of ethylene under the working pressure to effect solution of the ethylene in the vinyl acetate and acrylate up to the substantial limit of its solubility under the condition existing in the reaction zone, while the vinyl acetate and acrylate are gradually heated to polymerization temperature. The homogenization period is followed by a polymerization period during which the catalyst, which consists of a main catalyst or initiator, and may include an activator, is added incrementally or continuously together with the N-methylol containing monomer and any optional carboxylic acid, the pressure in the system being maintained substantially constant by application of a constant ethylene pressure if required. The semi-batch process is similar but some or all of the acrylate component is pre-emulsified with the N-methylol containing monomer and then added incrementally or continuously as the polymerization proceeds. In the case of the slow addition, some of the vinyl acetate is charged initially, and the remainder pre-emulsified with the N-methylol component and other comonomers and added incrementally.

Suitable as polymerization catalysts are the water-soluble free-radical-formers generally used in emulsion polymerization, such as hydrogen peroxide, sodium persulfate, potassium persulfate and ammonium persulfate, as well as tert-butyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, iron-II-salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion. The free-radical-formers can be charged in the aqueous emulsifier solution or be added during the polymerization in doses.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, methylene chloride and trichloroethylene, can also be added in some cases.

The dispersing agents are all the emulsifiers generally used in emulsion polymerization, as well as optionally present protective colloids. It is also possible to use emulsifiers alone or in mixtures with protective colloids.

The emulsifiers can be anionic, cationic or non-ionic surface active compounds. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkylphenols, as well as esters of sulfosuccinic acid. Suitable cationic emulsifiers are, for example, alkyl quaternary ammonium salts, and alkyl quaternary phosphonium salts. Examples of suitable non-ionic emulsifiers are the addition products of 5 to 50 mols of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. Preferably nonionic and/or anionic emulsifiers are used as emulsifying agents in amounts of 1 to 6% by weight of the polymerisate.

Suitable protective colloids optionally employed are partially or completely saponified polyvinyl alcohol with degrees of hydrolysis between 75 and 100% and viscosities of between 3 and 48 cps, measured as a 4% aqueous solution at 20° C.; water-soluble cellulose ether derivatives, like hydroxyethyl cellulose, hydroxypropyl cellulose methylcellulose or carboxymethyl cellulose; water-soluble starch ethers; polyacrylic acid or water-soluble polyacrylic acid copolymers with acrylamide and/or alkyl acrylates; poly-N-vinyl compounds of open-chained or cyclic carboxylic acid amides; and mixtures thereof.

The copolymers according to the invention have a glass transition temperature of between $-45°$ to $-20°$ C. and dry to form soft flexible films. They are generally crosslinked in a weakly acid pH range or in the presence of latent acid catalysts at elevated temperature. The optimum crosslinking temperatures are between 100° and 200° C., preferably between 130° and 160° C. Acid catalysts accelerate the crosslinking. Such acid catalysts are mineral acids or organic acids, such as phosphoric acid, tartaric acid, citric acid, or acid salts, such as chromium-III salts, aluminum chloride, ammonium chloride, zinc nitrate or magnesium chloride.

The process of making the vinyl acetate-ethylene-acrylate-N-methylol containing interpolymer lattices generally comprises the preparation of an aqueous solution containing at least some of the emulsifying agent and stabilizer, and the pH buffering system. This aqueous solution and the initial charge of vinyl acetate are added to the polymerization vessel and ethylene pressure is applied to the desired value. The quantity of ethylene entering into the copolymer is influenced by the pressure, the agitation, and the viscosity of the polymerization medium. Thus, to increase the ethylene content of the copolymer, higher pressures are employed. A pressure of at least about 10 atmospheres is most suitably employed. As previously mentioned, the mixture is thoroughly agitated to dissolve the ethylene, agitation being continued until substantial equilibrium is achieved. This generally requires about 15 minutes. However, less time may be required depending upon the vessel, the efficiency of agitation, the specific system, and the like. When high ethylene contents are desired, a higher degree of agitation should be employed. In any case, by measuring the pressure drop of the ethylene in conventional manner, the realization of substantial equilibrium can be easily determined. Conveniently the charge is brought to polymerization temperature during this agitation period. Agitation can be effected by shaking, by means of an agitator, or other known mechanism. The polymerization is then initiated by introducing initial amounts of the catalyst, and of the activator when used. After polymerization has started, the catalyst and the activator are incrementally added as required to continue polymerization, and the N-ethylol containing monomer and in the case of the semi-batch process, the acrylates are similarly added.

As mentioned, the reaction is generally continued until the residual vinyl acetate, acrylate and N-methylol monomer content is below about 1%. The completed reaction product is then allowed to cool to about room temperature, while sealed from the atmosphere.

By following the procedure described above, particularly the initial saturation of the polymerization mixture with ethylene before polymerization is initiated, there can be produced the stable vinyl acetate-ethylene-acrylate-N-methylol containing interpolymer latex characterized above, with the copolymer having an ethylene content of 10 to 30%, an intrinsic viscosity of 1 to 2.5 dl./g. (measured in dimethyl formamide) and an average particle size of 0.1 to 2 microns, with the latex having a high solids content of up to 60% or more.

The resultant emulsion polymers are then formulated using conventional components and techniques to produce the flocking adhesives of the present invention. Thus, the copolymers are compounded, if necessary, with sufficient thickeners to provide a viscosity within the range of about 10,000 to 30,000 cps.; they are adjusted (generally with ammonium hydroxide) to a pH of 7 to 10, preferably 7.5 to 8.5, and any optional foaming agents added thereto.

The thickeners useful herein are these conventionally employed in the art and include, for example, hydroxyethylcellulose, carboxymethylcellulose, various classes of polyacrylate-hydrolyzed acrylonitriles as well as the carboxylic acid/acrylate emulsions or solutions. Typical of such thickeners are Acrysol ASE-60 or ASE-95 from Rohm and Haas, Carbopol from B. F. Goodrich, Natrosol 250HR from Hercules, Paragum 500 or 501 from Parachem Southern, etc. These thickeners are generally present in the amounts of 1 to 5% by weight based on the adhesive solids.

The foaming agents which may be used herein are generally the water soluble salts of aliphatic carboxylic acids containing 16 to 20 carbon atoms, preferably those of the 18 carbon atom acids, representative of which are the alkali metal, ammonium or amine salts of stearic acid, tallow fatty acids and oleic acid. Most commonly employed is ammonium stearate. The foaming agents, if used, are present in amounts of 1 to 10%, preferably 2 to 8%, by weight of the adhesive solids.

Other additives including auxiliary foaming agents, foam stabilizers, ultraviolet absorbers, pigments, catalysts, fire retardants and the like may also be present in these foamable adhesives in amounts conventional in the art. In particular, since acid catalysts accelerate the crosslinking, a suitable catalyst for the N-methylol components is generally employed. Such acid catalysts are mineral acids or organic acids including latent acid catalysts, such as phosphoric acid, tartaric acid, citric acid, or acid salts, such as chromium-III salts, aluminum chloride, ammonium chloride, zinc nitrate or magnesium chloride, as known in the art. The amount of catalyst is generally about 0.5 to 2% of the total emulsion polymer solids.

Virtually any surfaces typically subjected to flocking may be flocked using the present adhesives. Typical surfaces or substrates include woven and non woven fabrics or scrims, paper, urethane foams, rubbers, fiberboard, fiberglass, polyethylene or polypropylene films and the like.

The choice of the fibers which can be applied by means of the adhesives of the invention is not critical. Thus, the flocked fibers may be flock obtained from cotton linters, wood pulp, rayon, polyamides, polyacrylics, polyesters, polyacetates, triacetates, polyolefins, glass fibers, wool, asbestos, etc. Staple fibers having an average length of from about 0.2 mm to about 2 mm are preferably used. Cut or milled flocks can be used with the length of the milled flocks varying from about 0.2 mm to 1 mm and those of the cut flock from 0.3 to 5 mm. If desired they can be colored or pigmented before application.

When required for use, the formulated flocking adhesive may be foamed using equipment readily available for foaming compositions. This is accomplished by beating air or another gas into the latex composition until a fine, uniform cell structure foam is obtained having the desired foam cell size and body. The volume of the latex composition is increased from about 2 to 10 times its original volume by the foaming or frothing process, preferably from 2 to 4 times its original volume. The resultant foamed adhesive is then applied to the substrate using any conventional means, e.g. knife coater. Alternatively, the adhesive may be thickened, but not foamed, and applied directly to the substrate using knife coating or other conventional techniques.

After application of the latex to the base material, the flocking material is applied to the surface of the foam coating and the composite is then dried at an ambient to elevated temperature. The drying step is carried out for a period of time and at a temperature sufficient to dry the applied latex. These will vary depending upon the particular latex employed and the amount thereof applied to the base material. The latex can be air-dried at ambient temperature conditions. However, drying can be over a period of from about 1 to 5 minutes at from about 125° to 175° C.

As to the amount of the flock adhesive used, it has been found that the amount of adhesive per square yard may vary from 0.5 to 3.0 ounces and the thickness of the adhesive coating from 0.010 to 0.050 inch in the wet state. There is a direct relationship between the amount of flock fiber which may be attached and the amount of adhesive employed. However, since it is contemplated that a rather broad range of flock lengths and quality may be used, the amount of adhesive and the thickness of the coating may well be extended under certain conditions depending on the type of fiber employed.

Several optional steps may be included in the process. For example, the flock itself may be treated with a suitable flame-retardant reagent. Additionally artistic and ornamental effects may be obtained by various techniques. For instance, by applying the adhesive in an ornamental pattern, flock will adhere to the areas constituting the pattern. Colored adhesives can be used to create further effects thereby varying the ornamental appearance of the product.

The following examples are given to illustrate the present invention, but it will be understood that they are intended to be illustrative only and not limitative of the invention. In the examples, all parts are by weight unless otherwise indicated.

EXAMPLE 1

This example describes the semi-batch preparation of the emulsion polymers utilized as a base for the flocking adhesives in accordance with the present invention.

A 10 liter stainless steel autoclave equipped with heating/cooling means, variable rate stirrer and means of metering monomers and initiators was employed. To the 10 liter autoclave was charged 450 g (of a 20% w/w solution) sodium alkyl aryl polyethylene oxide sulphate (3 moles ethylene oxide), 40 g (of a 70% w/w solution in water) alkyl aryl polyethylene oxide (30 mole ethylene oxide), 90 g (of a 25% w/w solution in water) sodium vinyl sulphonate, 2 g sodium formaldehyde sulphoxylate, 0.5 g sodium, acetate, 5 g (of a 1% solution in water) ferrous sulphate solution and 2500 g water. After purging with nitrogen all the vinyl acetate (2800 g) was added and the reactor was pressurized to 750 psi with ethylene and equilibrated at 50° C. for 15 minutes.

The polymerization was started by metering in a solution of 25 g. tertiary butyl hydroperoxide in 250 g of water and 25 g sodium formaldehyde sulphoxylate in 250 g of water. The initiators were added at a uniform rate over a period of 5¼ hours.

Concurrently added with the initiators over a period of 4 hrs was a pre-emulsified blend of 1200 g 2-ethylhexyl acrylate and 150 g N-methylol acrylide (48% w/w solution in water) in a solution of 450 g (of a 20% w/w solution in water) sodium alkyl aryl polethylene oxide sulphate (3 mole ethylene oxide), 25 g (of a 70% w/w solution in water) alkyl aryl polyethylene oxide (30 mole ethylene oxide) and 1 g sodium acetate in 400 g water.

During the polymerization, the temperature of the reaction was maintained at 55°–60° C. by means of cooling and at the end of the reaction, the emulsion was transferred to an evacuated vessel (30 liter) to remove residual ethylene from the system. Composition and analysis of the latex are given in Tables I and II.

EXAMPLE 2

Emulsions 2, 3, 4, 6 and 7 were prepared following the procedures of Example 1, but varying the amounts and components of the charges and utilizing additional comonomers. Composition and analysis of the lattices are also given in Tables I and II.

EXAMPLE 3

The following example utilizes the slow addition technique to prepare an emulsion polymer for use in the flocking adhesives of the invention.

To the 10 liter autoclave was charged 90 g. (of a 20% w/w solution in water) sodium alkyl aryl polyethylene oxide sulphate (3 moles ethylene oxide), 6 g (of a 70% w/w solution in water) alkyl aryl polyethylene oxide (30 mole ethylene oxide), 20 g (of a 25% w/w solution in water) sodium vinyl sulphonate, 2 g sodium formaldehyde sulphoxylate 0.5 g sodium acetate, 5 g (of a 1% w/w solution in water) ferrous sulphate solution and 2000 g water. After purging with nitrogen, 300 g vinyl acetate and 100 g butyl acrylate were charged to the reactor. The reactor was then pressurized to 750 psi with ethylene and equilibrated at 50° C. for 15 minutes. The polymerization was started by metering in a solution of 35 g tertiary butyl hydroperoxide in 250 g water and 35 g sodium formaldehyde sulphoxylate in 250 g water over a period of 6½ hours.

Concurrently added with the initiators over a period of 4 hrs was a pre-emulsified blend of 1900 g butyl acrylate, 1700 g. vinyl acetate, 150 g. (48% w/w solution in water) N-methylol acrylamide, 810 g. (of a 20% w/w solution in water) sodium alkyl aryl polyethylene oxide sulphate (3 mole ethylene oxide), 60 g. (of a 70% w/w solution in water) alkyl aryl polyethylene oxide (30 mole ethylene oxide), 1 g. sodium acetate, 60 g. (of a 25% w/w solution in water) sodium vinyl sulphonate in 600 g. water.

During the polymerization, the temperature of the reaction was maintained at 55°–60° C. by means of cooling and the pressure at 750 psi of ethylene by adding it when necessary. At the end of the additions of monomers and catalysts, the emulsion was transferred to an evacuated vessel following the procedure in Ex. 1 and is designated Emulsion 5 in Tables I and II.

TABLE I

| | (Composition) | | | | | | |
|---|---|---|---|---|---|---|---|
| Emulsion | VA | 2-EHA | BA | E | NMA | Other Monomers | Procedure |
| 1 | 51 | 34 | — | 15 | 1.5 | — | semi-batch |
| 2 | 42.5 | — | 42.5 | 15 | 4.0 | 2 parts methacrylic acid | semi-batch |
| 3 | 42.5 | — | 42.5 | 15 | 4.0 | 2 parts acrylic acid | semi-batch |
| 4 | 42.5 | — | 42.5 | 15 | 4.0 | 2 parts acrylic acid and 0.2 parts allyl methacrylate | semi-batch |
| 5 | 42.5 | — | 42.5 | 15 | 1.5 | — | slow add |
| 6 | 42.5 | — | 42.5 | 15 | 1.5 | — | semi-batch |
| 7 | 42.5 | — | 42.5 | 15 | 3.0 | — | semi-batch |

VA = Vinyl acetate
2-EHA = 2-ethylhexyl acrylate
BA = Butyl acrylate
E = Ethylene
NMA = N-methylol acrylamide

TABLE II

| | (Physical Properties) | | | | | |
|---|---|---|---|---|---|---|
| Emulsion | % Solids | pH | Viscosity | Particle Size (Microns) | IV (DMF) | Tg (°C.) |
| 1 | 50.2 | 5.0 | 150 | 0.31 | 0.81 | −33 |
| 2 | 51.7 | 3.7 | 350 | 0.24 | 1.93 | −24 |
| 3 | 51.7 | 3.4 | 375 | 0.24 | 1.59 | −24 |
| 4 | 51.2 | 3.6 | 545 | 0.25 | 0.54 | −23 |
| 5 | 50.8 | 4.1 | 130 | 0.27 | 0.85 | −31 |
| 6 | 52.2 | 3.7 | 60 | 0.30 | 1.61 | −23 |

TABLE II-continued
(Physical Properties)

| Emulsion | % Solids | pH | Viscosity | Particle Size (Microns) | IV (DMF) | Tg (°C.) |
|---|---|---|---|---|---|---|
| 7 | 48.2 | 4.2 | 50 | 0.43 | 1.20 | −27 |

Emulsions 1-7 were then used to prepare foamable flocking adhesives which were subjected to the tests described below. The emulsion copolymers were compounded into adhesives using the following formula:

| Ingredients | Parts by Weight |
|---|---|
| Latex (@ 50% solids) | 74.4 |
| Clay Slurry (60% solids) | 18.5 |
| Ammonium Stearate | 1.9 |
| Catalyst (20% solution) | 1.9 |
| Cellulosic Thickener | 0.7 |
| Ammonia (26%) | 0.5 |
| Water | 2.1 |

The following coating parameters were used to prepare flocked fabric for testing purposes:

The following test procedures were utilized in evaluating the binders prepared herein:

TESTING METHODS

Dry Abrasion Resistance: This test measures the durability of flocked fabrics to abrasive or rubbing type actions. A Tator Abrasion Test was done using a CS-17 wheel for 1000, 2000 and 4000 cycles. Samples were rated on a scale of 0 to 5.0 with 0 equal to complete flock loss and 5.0 equal to no flock loss. A rating of at least about 3.0 is considered average/satisfactory with a rating of 4.0 preferred.

Wet Abrasion Resistance: This test measures the durability of wet flocked fabrics to abrasive or rubbing type actions. In particular, this test would simulate the type of abrasion that would be experienced in a home laundering. A Tabor Abrasion Tester was utilized with Wheel #CS-17 for 500, 1000 and 2000 cycles. Samples were rated similar to the method used for Dry Abrasion Resistance. Samples were prepared by soaking them in water and then passing them through nip rollers @20 psi to insure consistent moisture level. Wet abrasion values of at least about 4.0 at 500 to 1000 cycles are preferred.

Hand: The purpose of this test is to determine the hand feel of each sample in terms of softness. Samples were compared to each other and ranked in order of softness, with 5.0 being the softest. Rating is subjective using a panel of 2 or 3 people. The softest hand possible is desired.

Pluck Strength: The pluck strength test measures the amount of force required to remove bound fibers from the adhesive. A Kelly Clamp is used to secure several flock fibers which is then connected to a hand held scale for measuring the force required to remove bound fibers. Pluck strength values of 2.0 lbs are normally required, with values of at least about 2.5 to 3.0 being desired.

Solvent Resistance: This test measures the durability of the flocked fabric to repeated dry cleaning cycles. Samples were folded, clamped and then submitted to a commercial dry cleaning operation for 3 and 6 cycles. Samples were rated by amount of flock loss from both face and fold edges of the fabric. A rating of 1.0 indicates complete flock loss and a rating of 5.0 equals no flock loss.

TABLE III

| TEST | Emulsion Number | | | | | | | Controls | | |
|---|---|---|---|---|---|---|---|---|---|---|
| | 1 | 2 | 3 | 4 | 5 | 6 | 7 | A | B | C |
| Dry Abrasion | | | | | | | | | | |
| 1000 cycles | 4.75 | 4.5 | 4.75 | 5.0 | 4.75 | 4.5 | 4.5 | 4.5 | 4.5 | 4.5 |
| 2000 cycles | 4.5 | 4.5 | 4.5 | 4.75 | 4.5 | 4.5 | 4.5 | 4.5 | 4.5 | 4.5 |
| 4000 cycles | 4.0 | 4.5 | 4.0 | 4.25 | 3.75 | 4.0 | 4.5 | 4.5 | 4.5 | 4.5 |
| Wet Abrasion | | | | | | | | | | |
| 500 cycles | 3.75 | N/T | 4.50 | N/T | 3.00 | N/T | N/T | N/T | N/T | N/T |
| 1000 cycles | 3.25 | 4.0 | 4.25 | 3.75 | 0 | 2.5 | 3.5 | 3.5 | 4.0 | 4.5 |
| 2000 cycles | 2.25 | 2.0 | 4.00 | 2.00 | 0 | 0.5 | 2.0 | 2.5 | 4.0 | 4.0 |
| Pluck Strength | 2.5 | 2.9 | 3.2 | 2.6 | 2.5 | 2.6 | 2.0 | 2.2 | 2.7 | 3.0 |
| Hand | 4.0 | 2.5–3.0 | 3.5 | 2.5–3.0 | 3.0 | 2.5–3.0 | 3.0 | 4.5 | 3.0 | 2.5 |
| Solvent Resistance | | | | | | | | | | |
| 3 cycles | 1.5 | 3.0 | 3.0 | 5.0 | 1.5 | 2.0 | 1.0 | 2.5 | 5.0 | 3.0 |
| 6 cycles | 1.0 | 2.5 | 2.5 | 5.0 | 1.0 | 2.0 | 1.0 | 2.5 | 5.0 | 3.0 |

A Commercially used "soft" all-acrylic adhesive (Tg = 30 C) (NMA = 3)
B Commercially used "hard" all-acrylic adhesive (Tg = −10 C) (NMA = 3)
C Commercially used "hard" EVA adhesive (Tg = −12 C) (NMA = 3; AA = 1)
N/T Not tested The results of Table III show that a superior balance of strength (as observed in Controls B and C) and softness (as observed in Control A) can be achieved using the flocking adhesives of the present invention. Thus, samples 1, 5 and 6 containing lower levels of NMA, while acceptable for some flocking applications, exhibit lower wet abrasion when compared to the controls, while samples containing higher levels of NMA gives strength values comparable to or greater than the B and C controls at the 500 to 1000 cycles performance level, falling off only at the very stringent 2000 level normally not required in flocking adhesive applications. Sample 5 utilizing the slow addition technique shows utility only at 500 cycles but would not be useful where higher wet durability performance is required. Sample 3 is shown to be optimum in all areas but solvent resistance and if higher levels of solvent resistance are required, addition of small amounts of a polyethylenically unsaturated monomer such as allyl methacrylate used in Sample 4 is preferred. The results also show that emulsions prepared using the batch polymerization procedure exhibit superior dry cleaning (solvent) resistance and hence this is the preferred procedure for producing flocking adhesives for applications wherein dry cleaning resistance is essential.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

We claim:

1. A process for manufacturing a flocked article which comprises the steps of:
(I) applying to the substrate to be flocked a composition comprising thickeners, pigments, optional foaming agents, and an aqueous emulsion prepared by the emulsion polymerization of:
  (a) a vinyl ester of an alkanoic acid having 1 to 13 carbon atoms interpolymerized with the following comonomers:
  (b) 10 to 30% by weight of ethylene;
  (c) 30 to 50% by weight of a $C_4$–$C_8$ alkyl acrylate;
  (d) 1 to 5% by weight of an N-methylol containing copolymerizable monomer;
  (e) 0 to 4% by weight of an olefinically unsaturated carboxylic acid having 3 to 6 carbon atoms; and
  (f) 0 to 1% by weight of a polyethylenically unsaturated comonomer; said adhesive being applied in an amount of 0.5 to 3.0 ounces per square yard;
(II) applying the flocking fibers to the coated substrate; and
(III) drying said flocked substrate.

2. The process of claim 1 wherein the aqueous emulsion is prepared using batch or semi-batch polymerization procedures.

3. The process of claim 1 wherein the vinyl ester is vinyl acetate and the N-methylol containing comonomer is N-methylol acrylamide or N-methylol methacrylamide.

4. The process of claim 1 wherein the N-methylol containing comonomer is present in an amount greater than 2.5% by weight.

5. The process of claim 1 wherein the polyunsaturated copolymerizable monomer is selected from the group consisting of vinyl crotonate, allyl acrylate, allyl methacrylate, diallyl maleate, divinyl adipate, diallyl adipate, diallyl phthalate, ethylene glycol diacrylate, ethylene glycol dimethacrylate, butanediol dimethacrylate, methylene bis-acrylamide and triallyl cyanurate.

6. The process of claim 1 wherein the emulsion contains sufficient thickener to provide a viscosity of 10,000 to 30,000 cps.

7. The process of claim 1 wherein the thickener is selected from the group consisting of hydroxyethylcellulose, carboxymethylcellulose, polyacrylate-hydrolyzed acrylonitrile and carboxylic acid/acrylate emulsions or solutions.

8. The process of claim 1 wherein a foaming agent comprising a water soluble salt of an aliphatic carboxylic acid containing 16 to 20 carbon atoms is present in an amount of 1 to 10% by weight of the adhesive solids.

9. A flocked article formed by the process of claim 1.

* * * * *